United States Patent Office 3,349,434
Patented Oct. 31, 1967

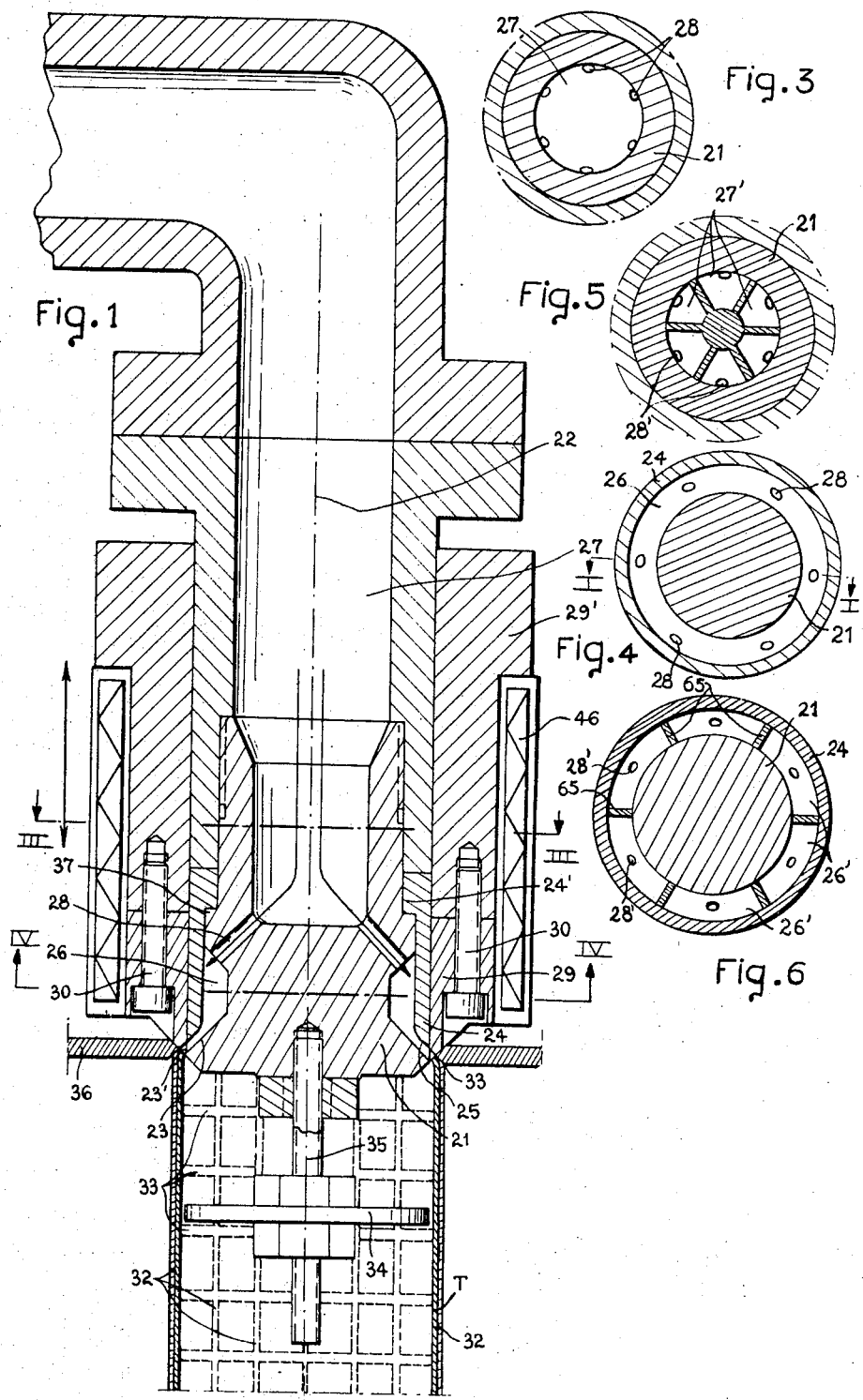

3,349,434
EXTRUSION OF ARTICLES WITH RIBBED
FULL WALLS
Jacques Hureau, Paris, France, assignor, by mesne assignments, to Societe Generale Alimentaire G.A.S.A., Neuilly-sur-Seine, Seine, France, a company of France
Original application Dec. 18, 1961, Ser. No. 159,965, now Patent No. 3,252,181, dated May 24, 1966. Divided and this application Apr. 7, 1966, Ser. No. 541,027
Claims priority, application France, Dec. 28, 1960, 848,186, Patent 1,310,478
5 Claims. (Cl. 18—12)

ABSTRACT OF THE DISCLOSURE

This invention relates to extruding articles with ribbed full walls, by means of two die members, one of which is provided with teeth; the die members are movable to and fro between two positions in which the teeth of said one member are respectively at two different distances from the other member, thereby defining alternately a narrow slot for extruding a full wall with parallel ribs and a larger slot for extruding further a transverse rib.

---

This is a division of my application Ser. No. 159,965, filed on Dec. 18, 1961, now Patent No. 3,252,181, for "Production of Profiled Pieces Showing a Lacunar or Reticulated Structure."

This invention is related to the manufacturing of articles with ribbed, full walls, by extruding a rapidly solidifiable material.

This invention is also related to a machine for manufacturing with a rapidly solidifiable material, articles with ribbed, full walls.

A first embodiment of a machine according to the invention comprises in combination an extrusion die having an elongated extrusion outlet with two edges substantially parallel to each other, and a comb-like member having a plurality of spaced teeth and arranged to be displaceable in relation to the outlet of the die between a first position, in which the teeth of the comb-like member project across the elongated outlet of the die with their tooth ends being at a first predetermined distance from one edge of the die outlet, and a second position, in which the teeth of the comb-like member project across the elongated outlet of the die with their tooth ends being at a second, substantially larger than the first, predetermined distance from the one edge of the die outlet. Means are further provided for intermittently displacing the comb-like member at successive predetermined times from its first position to its second position, and back to its first position.

Heating means may also be provided to keep at least the die at a selected temperature.

Another embodiment of a machine according to the invention comprises in combination an extruder including a die having two relatively movable, coaxially disposed members, operable to at least two positions defining therebetween annular extrusion outlets. One of the die members has a plurality of teeth extending in an axial direction thereof, and this one member is axially displaceable in relation to the other die member between a first position, in which the teeth of the one member are at a first predetermined distance from the other member, thereby defining a first extrusion outlet, and a second position, in which the teeth of the one member are at a second, larger than the first, predetermined distance from the other member, thereby defining a second, larger extrusion outlet. Means are further provided for displacing the one member periodically at predetermined intervals from its first position to its second position, and back to its first position.

A further embodiment comprises in combination two extrusion die members having elongated working surfaces. These die members are arranged with their working surfaces facing each other, and being separated by a narrow, elongated extrusion space. The die members are further mounted to be displaceable with respect to each other between a first position, in which the narrow extrusion space has a first predetermined width, and a second position, in which the narrow extrusion space has a second, larger than the first, predetermined width. Moreover, a plurality of extrusion channels extend through at least one of the die members, and means are provided for continuously feeding with the solidifiable material the input opening of the extrusion space and the inlets of the extrusion channels, and for alternately displacing the die members between their first and second positions.

In this embodiment, the extrusion channels may have closed cross-sections, or they may consist of grooves in the working surface of the die member.

This invention is also related to new products, consisting of extruded articles with ribbed, full walls.

A first new product according to the invention consists of an extruded sheeting of plastic material, having one smooth face and the other face provided with two pluralities of parallel ribs, extending transversely to each other (cross-ribbed sheeting).

Extruded cross-ribbed sheetings are already known, which have a first plurality of parallel ribs on the one face and a second plurality of ribs, transverse to the first, on the other face. There is no possibility for the machines used to extrude these cross-ribbed sheetings being arranged to form both pluralities of ribs, transverse to each other, on a same face of the sheeting, having then its other face smooth. The processes and machines according to the invention are first to extrude cross-ribbed sheetings having one smooth face. This new product is a much more valuable wrapping-material inasmuch as its smooth face is more adapted to come into contact with brittle or pulverulent articles to be wrapped therein, than a ribbed face is.

A second new product according to the invention consists of an extended, full-walled tube of plastic material, comprising a first plurality of linear ribs extending parallel to the axial direction of the tube, and a second plurality of annular ribs, extending transversely to this axial direction (cross-ribbed tube). In a preferred embodiment, the two pluralities of ribs are integral with a same face of the tube.

A cross-ribbed tube member according to the invention, specially having a smooth, inner face, is a quite valuable semi-manufacture for producing tubular containers such as sacks, bags and so on, by closing at least one end of the tubular member, particularly by welding, gluing or riveting this end.

Extruded ribbed tubes are already known, which have on one face thereof a first plurality of linear ribs, extending parallel to the axial direction of the tube, and on the other face, a second plurality of helical strands. There is no possibility for the machines used to extrude these known ribbed tubes being arranged to form a second plurality of annular ribs transverse to the first plurality of ribs, specially on the same face of the tube as this first plurality. As these known ribbed tubes have no smooth face, they are but poorly adapted for containing brittle or pulverulent articles, and further, as they have but helical ribs instead of annular ribs, their dimensional stability, specially in planes transverse to the axial direction of the tube, is much lesser than that of the cross-ribbed tubes according to this invention.

These and further objects and features of this invention will become more apparent from the following description and accompanying drawing, wherein:

FIG. 1 is a sectional view of a first embodiment of a machine for putting this invention into practice.

FIGS. 3 and 4 are cross-sectional views respectively along the lines III—III and IV—IV of FIG. 1.

FIGS. 5 and 6 are cross-sectional views of a variant of the embodiment in FIG. 1, along lines corresponding respectively to lines III—III and IV—IV of FIG. 1.

Figure 2:
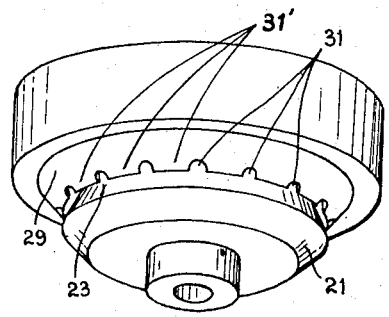
FIG. 2 is a perspective view from below the machine in FIG. 1.

FIGURES 1 and 2 are different views of the extruding members of a machine for extruding a continuous tube with ribbed, full walls according to the invention. These extruding members are a fixed die 21, having the form of a solid of revolution about the axis 22. Its lower part is provided with a machined, annular, conical surface 23, diverging towards the base of die 21. An annular member 24 is fastened to the die 21, particularly at 24', so as to form with the machined surface 23 an annular extrusion channel 25, which extends in a downward and axifugal direction. The upper, annular inlet of said channel 25 is fed with an extrudable material through an annular distribution chamber 26, which, in the example shown, is formed by a groove provided in the die 21 above the machined surface 23, this groove being closed peripherally by the annular member 24. The extrudable material is brought, in a convenient physical state, through the upper end of a channel 27, which extends axially in the part of the die 21 situated above the distribution chamber 26. Radial channels 28 are provided to connect the axial channel 27 to the distribution chamber 26. A movable die 29 is formed by a ring mounted about the lower part of the fixed die 21, above the lower edge of the machined surface 23, so as to be freely slidable along the ring 24 and the die 21. In the illustrated example, the movable die 21 is fastened for example by bolts 30 to a ring 29', which can slide along the middle and upper parts of the fixed die 21, in the direction of the axis 22. The lower part of the movable die 29 has also a machined, annular surface 23', in which radial grooves or channels 31 are cut, the cross-sections of which open on the said machined surface 23'. The end parts of the movable die 29 between said grooves or channels 31, form a kind of comb-like member, the "teeth" 31' of which are shown in FIG. 2. A heating sleeve 46, comprising for example an electric resistance winding, is located around the movable die 29 and the ring 29', to which it is fastened, so as to bring the movable die 29, and, by thermal conduction, the fixed die 21, to a temperature close to the extrusion temperature of the extrudable material, inasmuch as this temperature is higher than ambient temperature. The machine comprises further means for periodically passing the movable die 29 and the ring 29', to which it is fastened, by sliding along the fixed die 21 in the axial direction 22, from a first operative position, in which the respective machined surface 23 and 23' of the two dies 21 and 29 are separated from each other by a first, predetermined distance, to a second operative position, which is above the former in the example illustrated in FIG. 1, and in which the respective machined surfaces 23 and 23' of the two dies 21 and 29 are separated from each other by a second, larger than the first predetermined distance.

The extrusion of a ribbed full-walled tube according to this invention, by using the extrusion machine in FIGS. 1 to 4, will now be described.

When the movable die 29 is in its first, lower position, in which its "teeth" 31' have their ends at a first, predetermined distance from the machined surface 23 of the fixed die 21; the material flowing from the distribution chamber 26 is extruded (1) between the respective machined surfaces 23 and 23' of the dies 21 and 29, as a full tubular wall T having a thickness substantially equal to said first, predetermined distance, and (2) through the plurality of grooves or channels 31 as a first plurality of parallel, linear ribs 32, integral with the outer face of said tubular wall T, and extending substantially in the direction of extrusion thereof, that is in the axial direction of said tubular wall T. Each time the movable die 29 is temporarily in its second, upper position, in which its teeth 31' have their ends at a second, larger than the first, predetermined distance from the machined surface 23 of the fixed die 21, the material flowing from the distribution chamber 26 is extruded between the respective machined surfaces 23 and 23' of the dies 21 and 29, as an annular part having a thickness substantially equal to said second, predetermined distance, that is superior to the thickness of tubular wall T. As the movable die 29 is reciprocated between its lower and upper position, there is extruded a full-walled tube T, the outer face of which is provided (1) with a first plurality of longitudinal or axial ribs 32, and (2) with annular parts 33, thicker than the tube wall and regularly spaced along the same, which form a second plurality of outer annular ribs, transverse to said first plurality of longitudinal ribs. This extruded, full-walled tube T with an outer cross-ribbed face, according to the invention, has a very high dimensional stability, specially in planes transverse to its axis, as a consequence of the transverse annular ribs 33. The extruded tube T is received just below the outlet of the annular extrusion channel 25, on a gauge disc 34, which is fixed, for example by a screw 35, to the lower end part of the die 21. By means of a gauge disc 34 having a form and/or dimensions different from those of the cross-section of the tube T upon leaving the annular extrusion channel 25, it is possible, in taking advantage of the residual plasticity of the extruded material before its solidification, to modify the form and/or to increase or decrease the cross-sectional area of the tube T. It is also possible to modify the length of the extruded tube T before solidification, for example by applying tension forces on its tubular wall 32, 32', particularly by loading it with weights.

The means necessary for solidifying the tube T, which are to be adapted to the nature of the extruded material, has not been shown in FIGURES 1 and 2, because it is well known.

The machine which has just been described can easily be modified, as shown in cross-section in FIGS. 5 and 6, to extrude cross-ribbed, full-walled tubes with parallel, longitudinal strips of different colors, and may be of different widths, by subdividing the annular distribution chamber 26, by means of radial partitions 65 (FIG. 6) in a corresponding number of sub-chambers 26', which are fed separately through conduits 28' and 27' (FIG. 5) with the differently coloured materials to be extruded.

As the radial channels 31 in the die 29 are cross-sectionally open on the machined surface 23', when the movable die 29 is in its upper position, the material which is extruded through the annular channel 25 flows as well through the said channels 31, so that there is no interruption in the extrusion of the linear, longitudinal ribs 32, during each transverse, annular rib 31 is extruded. Consequently, each intersection of one longitudinal rib 32 with a transverse rib 33 has a cross-section, the area of which is nearly the sum of the areas of the cross-sections of said longitudinal and transverse ribs. The extrusion of the longitudinal ribs 32 can also be interrupted when each transverse rib 33 is extruded, by appropriate means, for example by a ring 36 which is disposed so as to stop, the outlets of the radial channels 31 of the die 29 when this last is in the upper position. This permits to extrude a full-walled tube having crossed ribs of uniform thickness, including at the crossing places of the longitudinal and transverse ribs.

The extruder illustrated in FIGS. 1 to 4 can also be operated in such a way that the two dies 21 and 29 are maintained in a constant position relative to each other with their machined surfaces 23, 23′ being separated by a constant predetermined distance. The parallel, linear strands which are then extruded through the radial channels 31 cut in die 21 or 29, or in both, then form continuous, longitudinal ribs on one at least of the inner and outer faces of the full-walled tube, no transverse annular rib being formed.

Different materials can be used for extruding the full wall of the tube and its longitudinal and transverse ribs.

The ribbed full-walled tubes extruded by the machine shown in FIGURES 1 to 4, particularly in synthetic material, can be cut longitudinally and be flattened into a sheet. These two operations can be carried out, in the case of a tube in a relatively rigid synthetic material, before solidifying the material. The ribbed full-walled tubes can be also used for manufacturing tubular containers, such as sacks, bags and so on, by closing one at least of their ends, specially by welding (preferably before solidification), or by gluing or riveting the said end.

Similar articles can be made in the manner just described from any extrudable material, notably:

(1) Synthetic materials, particularly thermoplastic and thermosetting compositions, as well as natural and synthetic rubbers; in the first case, the thermoplastic material is heated in the extrusion machine to its softening temperature, then it is cooled suddenly beneath the die 21, for example by immersion in a liquid, by the action of a current of cold air, etc.; the two dies 21 and 29 of the machine are then maintained preferably at the extrusion temperature. These dies are made preferably of a metal which is a good heat conductor.

(2) Materials extrudable in a moist state, such as viscose, which can be extruded cold, the hardening thereof below die 21 being obtained by immersing in, or by spraying with an appropriate product.

(3) Glass.

(4) Metals and their alloys in pasty or molten state.

Figure 7:
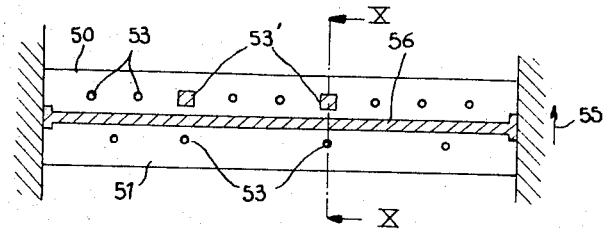
FIGS. 7 and 8 are schematic plan views respectively of the two operative positions of a second embodiment of an extrusion machine for putting this invention in practice.
Figure 8:
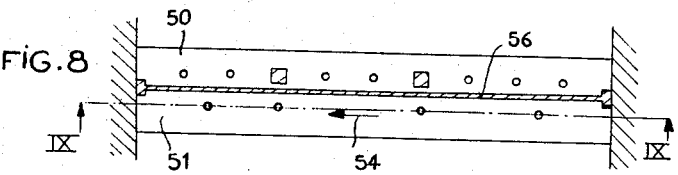
Figure 9:
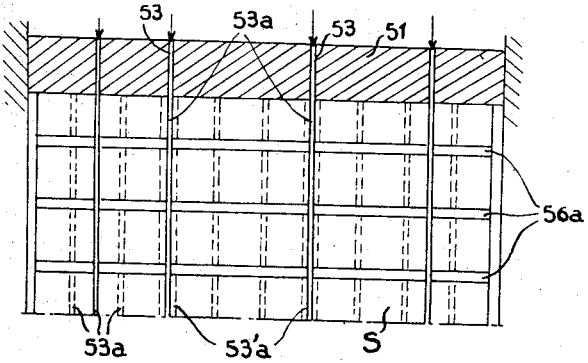
FIGS. 9 and 10 are cross-sectional views respectively along the lines IX—IX of FIG. 8 and X—X of FIG. 7.

FIGURES 7 to 10 illustrate schematically the operation of another embodiment of the machine according to the invention, which comprises two extrusion dies movable relative to one another, and of which one at least is provided with extrusion channels. On FIGURES 7 to 10, the two dies 50 and 51 are straight and parallel, but they may also be curved, and they are provided with extrusion channels 53, 53′, substantially parallel with one another, and substantially perpendicular to the direction in which the said dies extend, so that the ends of these channels are seen on FIGURES 7 and 8. In the example illustrated, the extrusion channels with which the dies 50 and 51 are provided have close transverse cross-sections, which differ both in form and dimensions, not only from one die to the other, but even in a same die. The die 50 for example comprises channels of circular cross-section 53, and channels 53′ of rectangular cross-section, whilst the die 51 comprises only channels of circular cross-section 53. Moreover, the two dies 50 and 51 comprise different numbers of extrusion channels, and the channels of one die are not facing the channels of the other die. The two dies 50 and 51 can be displaced relative to one another, one for example being fixed and the other movable. It is already known to use a couple of dies of this kind to extrude sheets, plates or tubes having cross-ribbed full walls, by displacing the two dies 50 and 51 relative to one another in the sense of the arrow 54 on FIGURE 8, that is to say in making the dies 50 and 51 slide while maintaining them separated from one another by a predetermined, constant distance. One chief aim of the present invention is to extrude sheets, plates or tubes having ribbed, full walls, by using a couple of movable dies such as that illustrated on FIGURES 7 to 10, and alternately moving the dies relatively to each other in the direction of the arrow 55 on FIGURE 7, so that their working surfaces, that are their surfaces facing each other, are permanently separated by a narrow, elongated extrusion space 56, the width of which is alternately varied between a first predetermined value, and a second, larger than the first, predetermined value. The process of forming a ribbed plate or sheet with the machine illustrated in FIGS. 7 to 10 is as follows:

In the first relative position of the two dies 50, 51, which is illustrated in FIG. 8, and in which the extrusion space 56 has its first, thinner, predetermined width, the material to be extruded, which is discharged through the inlet of channels 53, 53′ as well as through the input of said extrusion space, is extruded (1) through the extrusion space 56, as a full sheet or plate S (FIGS. 9 and 10) having a thickness substantially equal to said first, predetermined width of space 56, and (2) through the extrusion channels 53, 53′, as linear strands, parallel to each other and to the direction of extrusion and integral with either one face of sheet S, according to whether they are extruded through channels of die 50 or of die 51; these linear strands form a first, double plurality of parallel ribs 53a, 53a′ on either face of sheet S. In the second relative position of the two dies 50, 51, which is illustrated in FIG. 7, and in which the extrusion space 56 has its second, larger, predetermined width, the material is extruded through said larger space 56 as a transverse band having a thickness substantially equal to said second, larger width of space 56, that is superior to the thickness of sheet S. As dies 50, 51 are reciprocated between their first and second positions, there is extruded a sheet S (FIG. 9), both faces of which are provided (1) with a first plurality of parallel ribs 53a, 53a′, and (2) with bands 56a, transverse to ribs 53a, 53a′, thicker than the sheet S and regularly spaced along the same, which form a second plurality of parallel ribs, transverse to said first plurality of ribs.

Figure 10:
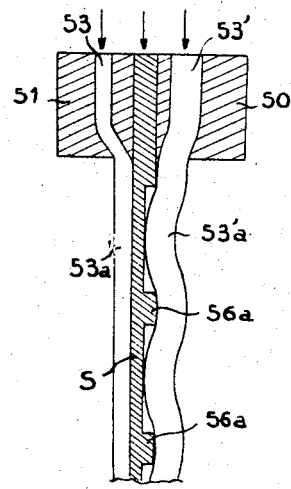

In the example illustrated, where channels 53, 53′ have closed sections, the connection between the linear ribs 53a, 53a′ and the sheet S which is continuously extruded, takes place clearly after the extrudable material leaves the outlets of the channels 53 and 53′, that is to say below the dies 50 and 51, as visible on FIGURE 10. However, the channels 53, 53′ of dies 50 and 51 may also open on the surfaces of dies 50 and 51, which are facing one another, that is in the extrusion space 56 between the dies. In this last embodiment, the connection between the ribs 53a, 53a′ and the sheet S takes place precisely in the extrusion space 56 between the two dies 50, 51. With the embodiment illustrated on FIGURE 10, the vertical ribs 53a, 53a′ are on one face or the other of the sheet S according to whether they have been extruded through the die 50 or through the die 51. Vertical ribs 53a, 53a′ being all on the same face of the sheet S can be obtained by providing extrusion channels in but one of the two dies. It is also possible to obtain a cross-ribbed sheet or plate having ribs of uniform thickness, by providing means for stopping the outlets of the extrusion channels of the dies 50, 51, only when these dies are in their second position (FIGURE 7), space 56 having then preferably a uniform width, whose first and second values differ by a quantity nearly equal to the cross-sectional size of the outlets of the extrusion channels.

The machine just described with references to FIG-

URES 7 to 10 may also be operated in keeping the two dies 50 and 51 permanently at a constant distance from one another. The extruded article is a sheet or plate of uniform thickness, one at least of the two faces of which has continuous ribs, all parallel to one another.

Figure 11:
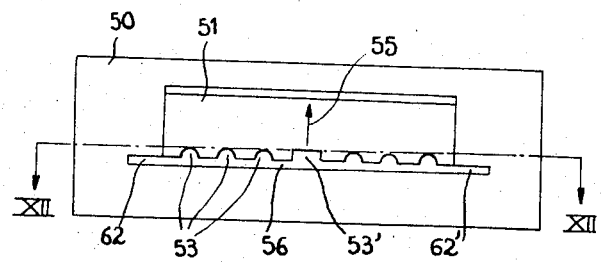
FIG. 11 is a plan view of a third embodiment.
Figure 12:
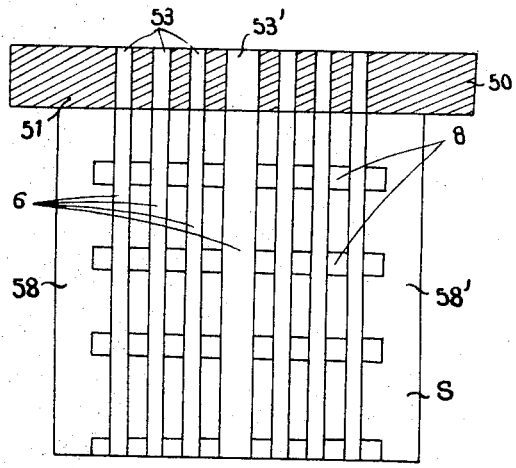
FIG. 12 is a cross-sectional view along the line XII—XII of FIG. 11.

FIGURES 11 and 12 are views of a further embodiment of the machine, the operation of which has been described above with reference to FIGURES 7 to 10. The dies 50 and 51 have extrusion channels 53, 53′ and are mounted so as to slide with respect to one another, in a direction perpendicular to their extrusion channels 53, 53′, which is indicated by arrow 55. The fixed die 50 is a tubular, hollow member, in which the solid die 51 is located so as to be displaceable alternatively between two positions, one position in which the facing surfaces of the two dies 50, 51 are separated from one another by a first, predetermined distance, and the other position, in which the facing surfaces of the two dies 50 and 51 are separated from one another by a second, larger than the first, predetermined distance. In the embodiment of FIGURE 11, only the movable die 51 comprises extrusion channels, which open on the surface of die 51 facing the die 50. There are provided two kinds of such open channels or grooves 53, 53′, different in the forms and dimensions of their cross-sections.

There will now briefly be described the extrusion of the ribbed, full-walled article of FIGURE 12 by means of the extruder of FIGURES 11 and 12.

In the position of the movable die 51 which is illustrated in FIG. 11, the material is extruded (1) through the extrusion space 56 between the facing surfaces of dies 50 and 51 and through recesses 62, 62′, as a full sheet S of uniform thickness (FIG. 12), and (2) through the extrusion grooves 53, 53′ as vertical, parallel ribs 6, integral with one face of sheet S. Each time the surface of the movable die 51 in which grooves 53, 53′ are cut, is in the position shown in FIG. 11 by line XII—XII, a horizontal, transverse rib such as 8 is extruded so as to be integral with the same one face of sheet S. Consequently there is continuously extruded a sheet S with a cross-ribbed middle part and two smooth borders 58 and 58′ (FIG. 12).

Means may be provided for stopping the outlets of the extrusion channels 53, 53′ so as to interrupt extruding the vertical ribs during the formation of each horizontal rib 8.

Figure 13:
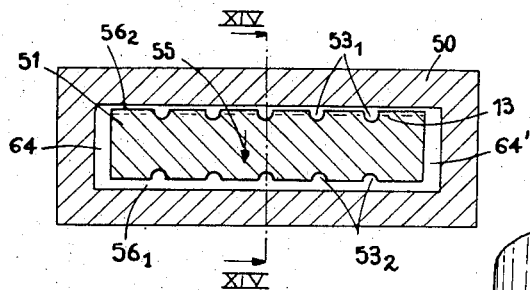
FIG. 13 is a cross-sectional view of a fourth embodiment.
Figure 14:
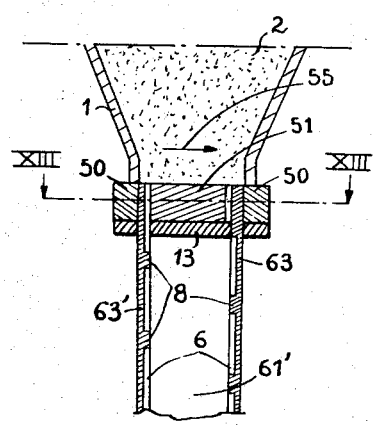
FIG. 14 is a cross-sectional view along the line XIV—XIV of FIG. 13.

The embodiment illustrated in FIGURES 13 and 14 comprises a hollow, tubular fixed die 50 and a solid, movable die 51. Open extrusion channels $53_1$, $53_2$ are provided on two flat surfaces of die 51, which face corresponding inner, flat surfaces of the hollow, fixed die 50. This machine can extrude a sort of tube having a rectangular cross-section, and comprising two opposed full walls 61, 61′, with smooth faces, which are continuously extruded through the recesses of constant size 64, 64′ (FIG. 13), and two ribbed, full walls 63, 63′ (FIG. 14), which are extruded as the cross-ribbed sheet of FIGURE 12. The horizontal ribs 8 of said two ribbed walls 63, 63′ are staggered as shown on FIGURE 14. A plate 13 split into a rectangular ring is located beneath the dies 50 and 51 (FIGURE 14), to regulate the thickness of the extruded ribs. By splitting this tube along one of its edges, a conditioning element, particularly in a flexible material, can be obtained.

Figure 15:
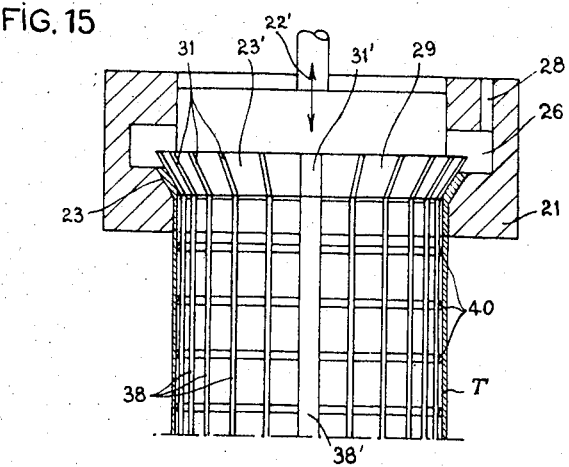
FIG. 15 is a view in partial cross-section of a fifth embodiment.

FIG. 15 is a section by a diametric plane of an extrusion machine according to the invention, which comprises a fixed die 21, having an annular form of circular cross-section, and a smooth machine surface 23, having the form of a zone of a circular cone. A movable die 29 is placed inside the fixed annular die 21, so that its machined surface 23′, having also the form of a zone of a circular cone, faces the machined surface 23 of the fixed die 21. Means are provided to displace the die 29 relatively to the die 21 along their common axis, as it is indicated by the arrow 22′. The machined surface 23′ of the movable die 29 is cut by channels of open cross-section, for instance channels or grooves of semi-circular cross-section 31, and by a single channel 31′, of larger rectangular cross-section. The extrudable material is brought, in a physical state appropriate to its extrusion, into an annular distribution chamber 26 provided in the die 21, through a channel 28. When the die 29 is in its lowermost end position, in which its machined surface 23′ is separated from the machined surface 23 of the fixed die 21 by a first, predetermined distance, the extrudable material brought into the distribution chamber 26 is extruded (1) between the machined surfaces 23, 23′ of dies 21, 29 as a full-walled tube T, and (2) through the channels 31, 31′, forming respectively vertical ribs 38 and 38′ on the inner face of tube T. When the movable die 29 is in its upper position shown in FIGURE 15, in which the two machined surfaces 23 and 23′ of the two dies are spaced from one another by a second, larger than the first, predetermined distance, the extrudable material brought into the distribution chamber 26 is still extruded through the channels 31, 31′, to form linear, vertical ribs 38, 38′, and it is also extruded between the machine surfaces 23, 23′ of dies 21, 29 so as to form an annular ring such as 40 on the inner face of tube T. The different annular rings such as 40, which are successively formed each time the movable die is brought to its upper position, along the arrow 22′, are integral with tube T and the vertical ribs 38, 38′. Consequently, there is continuously extruded a tube having an inner cross-ribbed face and a circular cross-section. By cutting this tube along the axis of its larger rib 38′ and by developing it, a cross-ribbed sheeting is obtained. These two operations can be carried out after or before solidification of the material.

Figure 16:
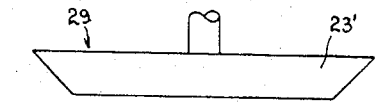
FIGS. 16 and 17 are respectively a side view and a cross-sectional plan view of the two die members of a sixth embodiment.
Figure 17:
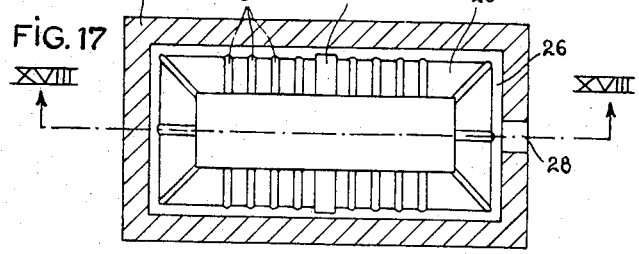
Figure 18:
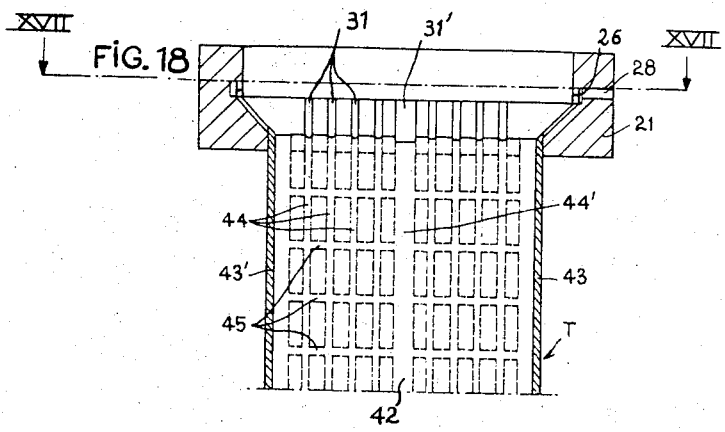
FIG. 18 is a cross-sectional view along the line XVIII—XVIII of FIG. 17.

The embodiment shown in FIGURES 16 to 18 comprises a fixed die 21 having an annular form, of rectangular cross-section, and a machined surface 23, in which transverse channels 31, 31′ are cut. These channels differ in their forms and in the dimensions of their cross-sections. A movable die 29 has likewise a rectangular cross-section, but no channel is formed in its peripheral machined surface 23′, which faces the machine surface 23 of the die 21. The extrudable material is brought through a channel 28 into an annular distribution groove 26, from which it flows into the extrusion channels 31, 31′, as well as into the space between the two dies 21 and 29. It can be seen that the extrudable material is continuously extruded through the interval between the two dies 21, 29, to form the four full walls 42, 42′, 43, 43′ of a tube T, having a rectangular cross section, which is illustrated in FIGURE 18, in section by a longitudinal plane. On the outer faces of these walls 42, 42′, 43, 43′, are formed linear, vertical ribs 44, 44′, which are continuously extruded respectively through channels 31, 31′, and linear, horizontal ribs 45, which are periodically extruded in the space between the machined surfaces 23, 23′ of the two dies 21 and 29. The cross-ribbed tube T of rectangular cross-section thus obtained, can be split along one of its edges, before or after solidification, for forming for instance conditioning receptacles, particularly of a synthetic material, these receptacles comprising cross-ribbed walls.

The embodiments of the invention previously described can be easily adapted to extrude ribbed, full-walled articles, having parallel, longitudinal strips of different colours and widths. This can be achieved by dividing the distribution chamber in a corresponding number of sub-chambers, each of which is fed, through a separate channel, with an extrudable material having a desired colour.

What I claim is:

1. A machine for manufacturing articles with ribbed full walls in a rapidly solidifiable material, comprising means defining an elongated slot having a variable transverse width for continuously extruding therethrough a full wall, means defining separated orifices for continuously extruding parallel, longitudinal ribs integral with at least one face of the continuously extruded, full wall, and means to alternately increase and decrease the transverse width of said elongated slot, whereby one transverse rib is extruded integrally with one face of said full wall each time the transverse width of said elongated slot is increased.

2. A machine for manufacturing articles with ribbed, full walls in a rapidly solidifiable material, comprising an extrusion die having an elongated extrusion outlet with two edges substantially parallel to each other, a comb-like member having a plurality of spaced teeth and arranged to be displaceable in relation to the outlet of said die between a first position in which the teeth of said comb-like member project across the elongated outlet of said die with their tooth ends being at a first predetermined distance from one edge of said die outlet, and a second position, in which the teeth of said comb-like member project across the elongated outlet of said die with their tooth ends being at a second, substantially larger than the first, predetermined distance from said one edge of the die outlet, and means for alternately displacing the comb-like member between its said first and second positions.

3. A machine for producing articles with ribbed, full walls in a solidifiable material, comprising two extrusion die members having elongated working surfaces, each extending between a first and a second elongated border, said die members being arranged with their working surfaces facing each other, and being separated by a narrow, elongated extrusion space having narrow, elongated input and output openings between the respective first and second borders of the working surfaces, said die members being further mounted to be displaceable with respect to each other between a first position, in which said narrow extrusion space has a first, predetermined transverse width, and a second position, in which said narrow extrusion space has a second, larger than the first, predetermined transverse width, a plurality of extrusion channels, each extending through one of said die members from an inlet to an outlet arranged near to the second border of the working surface, means for continuously feeding with the solidifiable material the input opening of the said extrusion space and the inlets of said extrusion channels, and means for alternately displacing said die members between their first and second positions.

4. The machine of claim 3 in which some at least of the extrusion channels have closed cross-sections.

5. The machine of claim 3, in which some at least of the extrusion channels consist of grooves in the working surface of the die member.

References Cited

UNITED STATES PATENTS

| | | |
|---|---|---|
| 3,193,604 | 7/1965 | Mercer. |
| 2,919,467 | 1/1960 | Mercer _____ 18—12 X |
| 3,019,483 | 2/1963 | Schultheiss _____ 18—12 X |
| 3,112,526 | 12/1963 | Martin _____ 18—12 |
| 3,172,154 | 3/1965 | Martin. |
| 3,252,181 | 5/1966 | Hureau _____ 18—12 |

WILLIAM J. STEPHENSON, *Primary Examiner.*